Dec. 13, 1938. P. L. BETZ ET AL 2,140,466
SAFETY DEVICE FOR GAS HEATERS
Filed Feb. 3, 1938
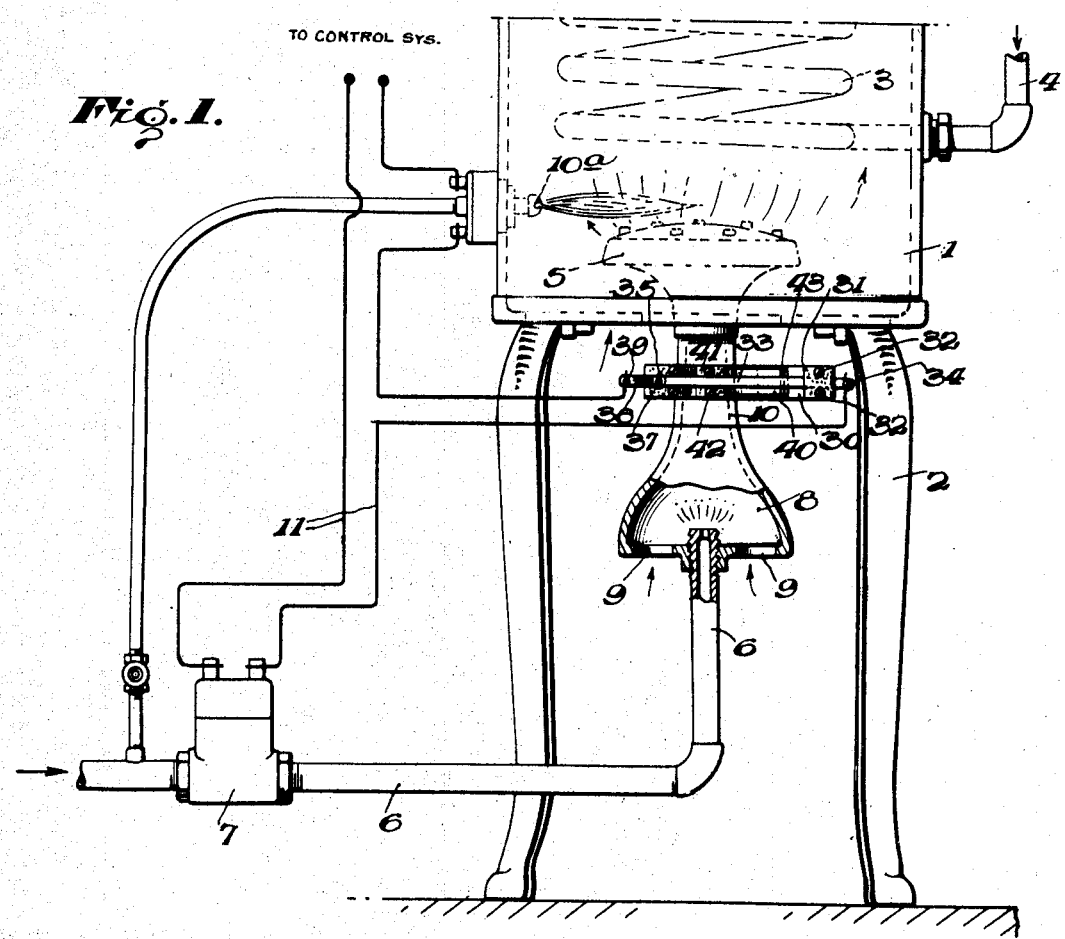
Inventors
Paul L. Betz
Sebastian Karrer
By Cameron, Kerkam + Sutton Attorneys Patented Dec. 13, 1938

2,140,466

UNITED STATES PATENT OFFICE 2,140,466

SAFETY DEVICE FOR GAS HEATERS

Paul L. Betz, Baltimore, Md., and Sebastian Karrer, Washington, D. C., assignors to Consolidated Gas Electric Light and Power Company of Baltimore, Baltimore, Md., a corporation of Maryland Application February 3, 1938, Serial No. 188,554

2 Claims. (Cl. 158—117.1)

This invention relates to safety devices for gas burners as for example in the ordinary household gas heater for heating water or for other purposes and is a divisional application of our copending application Serial No. 38,654.

Gas heaters of conventional types are subject at times to what is known in the art as a flashback. Such heaters usually comprise a gas burner, the gas being mixed with air in a mixing chamber adjacent the burner and the combustible mixture of gas and air being conducted to the burner where it is ignited by means of a pilot. At times the flame flashes through the burner ports and the gas burns in the chamber where the mixture of air and gas normally takes place. When such a flashback occurs, the gas often burns with insufficient oxygen resulting in the production of a relatively large quantity of carbon monoxide, and for this reason such devices are conventionally provided with flue connections. To prevent the danger incident to the production of carbon monoxide and to minimize the need for flue connections, it is desirable to provide safety means whereby the gas supply is shut off in the case of a flashback. In order that such devices may have maximum utility and advantage, particularly in the case of automatic appliances, it is further necessary that the safety means employed be of such nature as to restore the system automatically to normal operating condition after the gas has been shut off.

One of the objects of the invention is to provide means in combination with a gas burner which means operates automatically in case of flashback, first to shut off the gas supply and then to restore the system to operating condition.

Another object is to provide novel means responsive to thermal conditions existing in the mixing chamber or between the same and the burner for controlling the supply of combustible mixture to the burner.

A further object is to provide thermally controlled valve means for a gas burner which means is movable automatically to open or closed positions according to the thermal condition existing in the mixing chamber supplying the mixture of gas and air to the burner.

A still further object is to provide, in combination with a valve regulating the gas supply to a burner, a novel thermostatic means exposed to heat resulting from a flashback for moving the valve to closed position.

Another object is to provide, in combination with a valve regulating the gas supply to a burner, controlling or actuating means for regulating the position of the valve which means are thermally controlled so that said valve is closed automatically in case of flashback, but said means are thereafter restored to normal operating condition for regulating the position of the valve.

Another object is to provide, in combination with an electrically operated valve controlling the gas supply to a burner, an energizing valve circuit having thermally responsive regulating means which are subjected to the temperature in the mixing chamber supplying the mixture of gas and air to the burner and are arranged to control said circuit in such a way as to cause the closing of the valve in the event of flashback.

Other and further objects will appear as the description of the invention proceeds.

One embodiment of the invention has been illustrated in the accompanying drawing, but it is to be expressly understood that said drawing is for purposes of illustration only and is not to be construed as a definition of the limits of the invention, reference being had to the appended claims for this purpose. In said drawing:

Fig. 1 is a diagrammatic illustration of a gas water heater and connections thereto which is equipped with electrical control means embodying the invention;

Fig. 2 is an enlarged view of the thermally responsive control element of Fig. 1; and Fig. 3 is a view of said thermally responsive element as seen from the top in Fig. 1.

Generally speaking, the invention embodies a thermally responsive element which is subjected by conduction to temperature conditions existing in the mixing chamber wherein the mixture of gas and air takes place or in the conduit leading from this chamber to the burner itself. Since in the event of flashback the conduit and mixing chamber are subjected to abnormal temperature, a thermally responsive element exterior of the conduit and mixing chamber subjected to this temperature by conduction through the walls of the conduit and mixing chamber can be employed in the event of flashback to regulate a suitable gas control valve. This valve may be either a special safety valve, or in an automatically operating system the supply valve of the system may be controlled by said thermally responsive means in addition to the normal control thereof by the usual or any suitable automatic devices. The thermally responsive element is located externally of the mixing chamber and conduit and is heated by conduction through the walls of the same, and any suitable form of thermostatic device may be employed depending upon conditions of use, such as bimetallic members, collapsible and expansible members, etc.

Further, the means whereby the valve is actuated or controlled by the thermally responsive means is here shown as electrical of standard type used with the control system to be employed for the heater. With such an electrical system, various control devices and circuits may be employed, and the particular manner in which a device embodying the present invention is to be used will depend on the nature of such control systems. For example, in systems embodying electrically controlled or operated valves, the device may be connected in series in the valve circuit. On the other hand, where an electrical valve control system is employed which embodies other valve control devices such as relays, the flashback control may be utilized to prevent the normal operation of such control devices and in turn of the supply valve.

One illustrative embodiment of the invention has been shown in the drawing. Figs. 1, 2 and 3 illustrate the embodiment of the invention applied to a heating system which is electrically controlled, the thermally responsive element being located outside of the mixing chamber. Referring to Fig. 1, a gas water heater of any suitable type is conventionally illustrated, this heater comprising a shell 1 supported on legs 2 and enclosing a coil 3 having an inlet connection 4. Water passing through the coil is heated by means of the gas burner 5 supplied with gas through pipe 6 in which is incorporated a control valve 7. As indicated above, this valve 7 may comprise the main supply valve of the system, which in an automatic system is controlled by known or any suitable devices, or it may comprise a special safety valve which is closed only in the event of a flashback. When the valve is open, gas passing through the pipe 6 enters a mixing chamber 8 which, as shown, is of conventional form and in which the gas is mixed with air entering said chamber through one or more ports 9. The combustible mixture of gas and air passes from the mixing chamber to the burner 5 through a conduit 10, where it is ignited by the usual or any suitable pilot device 10a. It will be understood that the particular design and details of the system as thus far described constitutes no part per se of the present invention.

As shown in Fig. 1, the valve 7 is electrically controlled through the leads 11. Electrically operated valves of various types are known and can be obtained on the market. One suitable type of valve comprises an operating electromagnet which holds the valve open against spring tension during operation of the system, the spring restoring the valve to closed position when the electromagnet is deenergized, and this type of valve is assumed in the following description. In the event that valve 7 is the main supply valve of an electrically controlled automatic system, the supply of current through the leads 11 to the valve will be controlled by any suitable automatic system which may be connected to the leads 11 in any suitable manner. Since the details of such systems constitute no part of the present invention, the control circuits are not shown or described herein.

The details of construction of a suitable thermally responsive device comprising a bimetallic thermostat are shown in Figs. 2 and 3. These figures show a thermostatic element which is mounted on the exterior of the conduit 10 connecting the mixing chamber 8 with the burner and is responsive to heat in the event of flashback by conduction through the metallic wall of the conduit. Preferably a metallic heat conducting path is provided to promote reliability and speed of operation. Hence the thermostat, which for purposes of illustration shown as a bimetallic element, is supported on a metal block 27 which is shaped to fit closely against the wall of the conduit 10 and is clamped tightly thereto in any suitable manner as by means of the strap 28 and screws 29. The block 27 in the form shown is provided with a laterally extending arm 30 which carries blocks 31 of any suitable material secured thereon by means of screws 32 and serving to hold a resilient conductive arm or strip 33. The strip 33 is suitably insulated from its support, as by the use of interposed strips of insulating material such as mica if the blocks are of metal or other conductive material, or by making said blocks of suitable insulating material. One of the leads 11 of a suitable electrically controlled valve as described above, is connected to the terminal 34 at one end of the strip 33, and a contact 35 is carried by said strip at its other end and coacts with a contact 36 mounted on a block 37 of insulating material that is carried by the metallic block 27. The other lead 11 of the valve is suitably connected to the contact 36 as by means of the conductive terminal strip 38 and terminal 39. Contacts 35 and 36 are normally held closed by the resilience of the strip 33 and are adapted to be opened by the thermostatic element in the event of flashback.

The thermostatic element in Figs. 2 and 3 comprises a bimetallic strip 40 which is mounted on the block 27 by means of the spacer block 41 and screws 42, the spacer block being preferably of metal to provide good heat conductivity from the block 27 to the strip. The strip 40 extends parallel to and closely adjacent the arm 30 of the block 27. At the end of the bimetallic strip 40 is a contact block 43 preferably of insulating material which bears against the resilient strip 33. In the event of flashback, the heat within conduit 10 is conducted through the wall of the conduit to block 27 and the bimetallic strip 40 is heated by conduction and radiation from block 27 and its laterally extending arm 30. Heating of the bimetallic strip causes it to bend so that the block 43 moves the resilient arm 33 and separates contacts 35 and 36, thereby interrupting the circuit to the electromagnetic valve and shutting off the gas supply. As soon as the strip 40 cools down, however, the resilience of the strip 33 causes contacts 35 and 36 to return to normal closed position thereby restoring the controlling circuits of the valve to normal condition.

It will be perceived that the invention provides a safety device which is automatically operative to stop the flow of gas to the burner in the event of a flashback and which is also automatically operative thereafter to restore the system to normal condition for operation by any of the usual control means that may be provided. The invention thus has the advantage of providing an effective safety device while at the same time interfering in no way with the normal or any desired control or operation of the heating system, except in the event of flashback and only so long as an abnormal temperature prevails. The danger incident to the production of carbon monoxide in the event of flashback is eliminated by the invention, and in the case of automatically controlled and operated systems, flue connections are unnecessary. These results are accomplished by a simple, inexpensive device which is at the same time dependable and reliable in operation.

In the case of an automatic or semi-automatic system, the feature of restoring the system to normal operative condition in an automatic manner is particularly advantageous. Safety devices which merely shut off the supply of gas, as by the fusinng of a metallic link or some equivalent operation, usually require the services of a skilled mechanic in order to restore the system to operating condition, which results in the system being inoperative and useless for considerable periods of time. Devices embodying the present invention, however, incorporate the desired safety feature in the system in an effective and dependable operation, while at the same time they permit renewed operation of the system immediately after the flashback has been extinguished and without attention or manual adjustment. In the event of flashback, the interruption of service is, thereby, only temporary.

While one embodiment of the invention has been described and illustrated in the drawing, it is to be expressly understood that the invention is not limited thereto, as changes may be made in the form, details of construction and arrangement of the various parts, while equivalent thermostatic devices may be substituted for that described and illustrated, all without departing from the spirit of the invention. Thus, any suitable type of thermostatic element may be used in place of the bimetallic strip of Figs. 1-3 to operate the electric contacts involved in these systems. Further, the manner of installation of the thermostatic element and the operating mechanism actuated thereby may be varied widely. Reference is, therefore, to be had to the appended claims for a definition of the limits of the invention.

What is claimed is:

1. In a device of the class described, the combination of a burner, means for mixing gas and air and supplying the mixture to said burner, an electrically controlled gas supply valve, an energizing circuit for said valve, a normally closed make and break device for said circuit, and a thermally responsive bimetallic element secured to the wall of said first-named means in heat-conducting relation therewith and operatively connected with said device, said device being disposed outside said mixing means and not subject to heat therein.

2. In a device of the class described, the combination of a burner, means for mixing gas and air and supplying the mixture to said burner, an electrically controlled gas supply valve, an energizing circuit for said valve, a bimetallic element, a metallic heat conductive frame carrying said element and secured to the outer wall of said means to conduct heat from said means to said element, and a pair of contacts for controlling said circuit that are not subject to heat from said means, said element being operatively connected with said contacts to operate the same.

PAUL L. BETZ.
SEBASTIAN KARRER.